United States Patent [19]

Einhaus

[11] Patent Number: 4,766,586
[45] Date of Patent: Aug. 23, 1988

[54] DISC-RECORD PLAYER

[75] Inventor: Hermanus F. Einhaus, Ham, Belgium

[73] Assignee: U.S. Philips Corporation, New York, N.Y.

[21] Appl. No.: 18,107

[22] Filed: Feb. 20, 1987

[30] Foreign Application Priority Data

Feb. 28, 1986 [NL] Netherlands .......................... 8600508

[51] Int. Cl.⁴ .......................... G11B 3/10; G11B 17/08
[52] U.S. Cl. .................................... 369/217; 369/186; 369/188
[58] Field of Search ............... 369/216, 217, 184, 188, 369/186

[56] References Cited

U.S. PATENT DOCUMENTS

| | | | |
|---|---|---|---|
| 2,950,921 | 8/1960 | Guest | 369/186 |
| 3,804,422 | 4/1974 | Kobashi et al. | 369/217 |
| 3,941,392 | 3/1976 | Grosemans et al. | 369/217 |
| 3,966,330 | 6/1976 | Ridley | 369/217 |
| 4,701,903 | 10/1987 | Einhaus | 369/216 |

*Primary Examiner*—Steven L. Stephan
*Attorney, Agent, or Firm*—David R. Treacy

[57] ABSTRACT

A disc-record player comprises a deck plate (1) which carries a rotatable turntable (2) and a pivotable pick-up arm (4). This arm is rigidly connected to a pick-up arm support (24). In the turntable two depressible sensing pins (38,39) are arranged. Further, a control device is provided which comprises inter alia a drive element (20) for controlling the pivotal movement of the pick-up arm (4) and which can be coupled to the pick-up arm support (24). There is also provided a selection element (27) which can be set selectively to two operative positions and which carries first and second positioning projections (29a, 29c). The device also comprises a starting element (17). A positioning element (32) which cooperates with the selection element (27) is provided with two positioning portions (34, 35) against which the sensing pin (38, 39) abuts, after which the selection element (27) is actuated. The positioning portions (34, 35) can be moved up and down and can cooperate with the sensing pin (38,39) in the upper position only, the starting element keeping the positioning portions in the upper position. After the first rotation of the turntable (2) the starting element (17) returns, so that the positioning portions (34, 35) are also returned. The selection element (21) is subsequently reset to an inoperative position in which a third positioning projection (29b) functions as a stop to prevent the pick-up arm (4) from being pivoted out of its rest position. This is achieved by the presence of a control element (22) on the drive element (20) which positions the selection element (27) in the inoperative position after every pivotal movement of the pick-up arm (4) towards the turntable (FIG. 2).

20 Claims, 4 Drawing Sheets

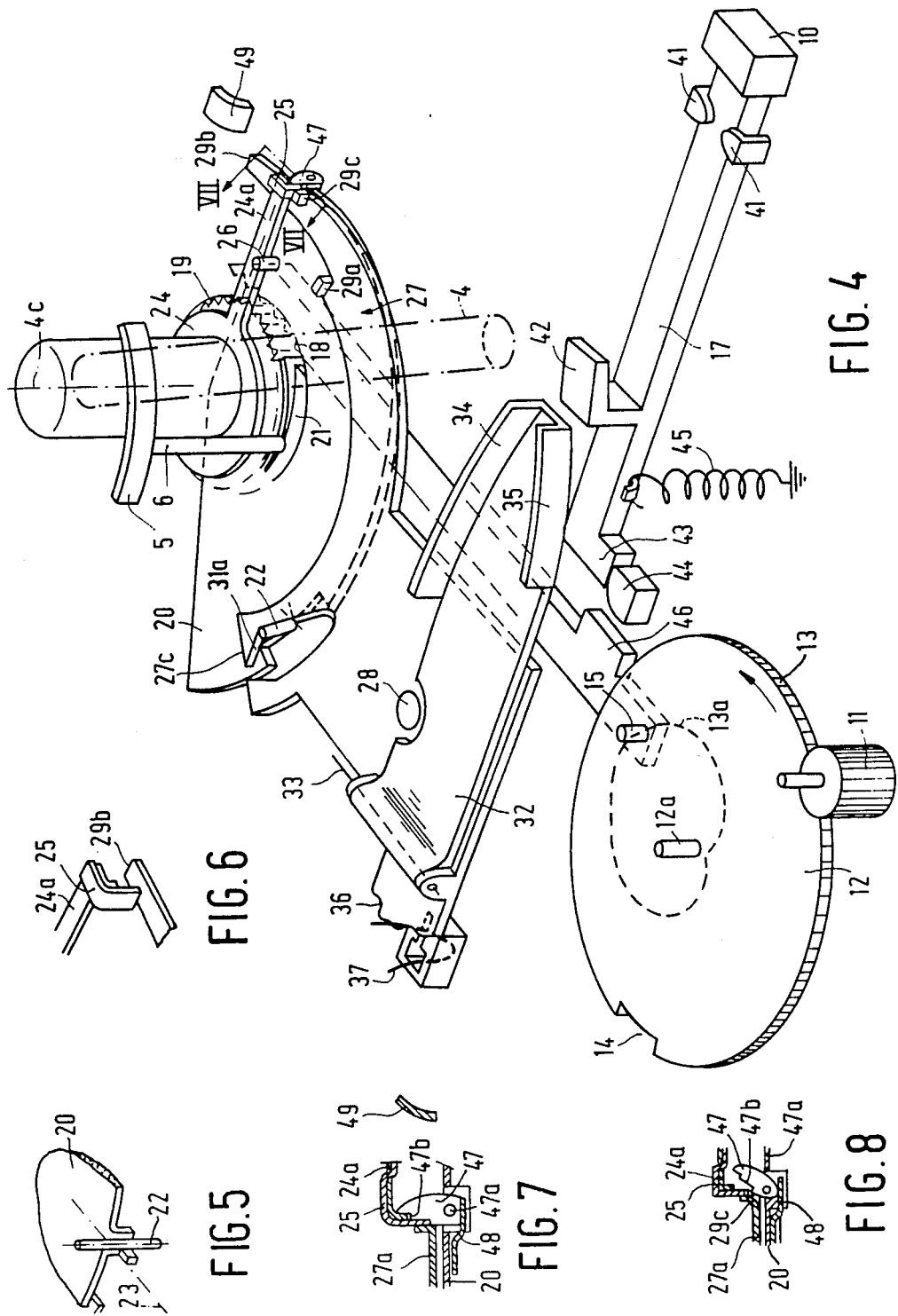

DISC-RECORD PLAYER

The invention relates to a disc-record player comprising a deck plate carrying a rotatable turntable and a pivotable pick-up arm which is rigidly connected to a pick-up arm support underneath said deck plate, in which turntable two depressible sensing pins are arranged at different distances from the turntable shaft to sense the presence of a disc record on the turntable, a control device being provided which comprises:

- a drive element which is movably connected to the deck plate and which is provided for controlling the pivotal movement of the pick-up arm from a rest position towards the turntable and for this purpose can be coupled to the pick-up arm support,
- a selection element, which can be set selectively to two operative positions and carries first and second positioning projections, which each constitute a stop for the pivotal movement of the pick-up arm support as a result of the coupling to the drive element, to position the free end of the pick-up arm above the turntable in a first position and a second position respectively,
- a positioning element which cooperates with the selection element and which comprises first and second positioning portions which during a revolution of the turntable cooperate with a first or a second depressed sensing pin respectively depending on the diameter of a disc record placed on the turntable after which the positioning element always sets the selection element in one of the operative positions, and
- a starting element which is movable between two positions and which by a movement to a first position causes the rotation of the turntable to be started and the control device to be activated.

A disc-record player of the above type is known from German Patent Specification No. 2,446,130 to which U.S. Pat. No. 3,941,392 corresponds. Such a record player is intended for the fully automatic playback of disc records. The user merely has to place a disc record on the turntable and actuate the starting element, after which the control device of the player raises the pick-up arm out of its rest position on an arm support, then pivots the arm into a position above the turntable and lowers it until the scanning stylus on the free end of the pick-up arm has reached the lead-in groove of the disc record. In the known record player the whole selection element is movable to and fro in order to bring the selection element into the path of a pin on the arm support to position this support. After the stylus has been set down on the disc the selection element moves upwards again, so that during playing of the disc the pick-up arm can pivot further without being obstructed by the selection element. A characteristic feature of the known disc-record player is that after a displacement as a result of contact between one of the sensing pins and an associated positioning member the selection element, viewed parallel to the pivotal axis of the pick-up arm, remains in the selected position until a disc of another diameter is put on. Consequently, when a starting element is actuated and there is no disc on the turntable, the pick-up arm will never the less pivot towards the turntable. This may pose a problem if the user cannot set the entire turntable and certainly if the turntable is mounted in a drawer, in which situations the record player may readily be started without a disc being present. When the known disc-record player is started in these situations the stylus or other parts of the player may become damaged. Another disadvantage of the known disc-record player is that a comparatively large number of parts are required for automatic control of the arm movement, which may give rise to undesired switching noises during operation of the control device.

It is the object of the invention to construct the control device in a disc-record player of the type defined in the opening paragraph in such a way that if there is no disc on the turntable the pick-up arm is not pivoted towards the turntable and in such a way that switching noises produced during operation of the control device are minimized. To this end the invention is characterized in that

- the positioning portions are movable between an upper or operative and a lower or inoperative position, the positioning portions being situated in the path of the respective depressed sensing pin in the upper position only, a movement of the starting element to the first position causes the positioning portions to be set to the upper position and a movement of the starting element to a second position causes the positioning portions to be set to the lower position,
- control means are provided which after the first revolution the turntable enable the starting element to move out of the first position, so that the starting element moves to the second position,
- the selection element can also be set to an inoperative position in which a third positioning projection of the selection element functions as a stop for the pick-up arm support to prevent the pick-up arm from being pivoted out of the rest position, and
- the drive element carries a control element which positions the selection element into the inoperative position after every pivotal movement of the pick-up arm support and of the free end of the pick-up arm into one of the positions above the turntable.

The construction of the disc-record player in accordance with the invention ensures that the positioning element, which is set to the upper operative position upon starting, is automatically returned into the inoperative position after one revolution of the turntable, in which inoperative position it cannot cooperate with one of the sensing pins. Thus, during one revolution of the turntable the selection element can be moved via the positioning element. Since the selection element is in the inoperative position when the player is started the pick-up arm cannot be moved and remains in the rest position if there is no disc on the turntable. Thus, if there is no disc on the turntable, the selection element is not actuated and the positioning element moreover returns directly to the rest position. As a result of this, the pick-up arm cannot be pivoted towards the turntable and undesirable switching noises are avoided. If a record of, for example, 30-cm diameter is put on, the positioning element and hence the selection element which cooperates therewith will be moved, via one of the sensing pins, to the position in which one of the positioning projections is moved into the path of the pick-up arm support as a stop. The control means then ensure that immediately after the movement of the selection element the starting element returns from the first or starting position to the second or rest position, so that the positioning element also returns to the rest position. As this movement takes place immediately after one revolution of the turntable it is ensured that the sensing pins already become disengaged from the positioning elements after one revolution. Another great advantage is that immediately after the pick-up arm has been positioned above the turntable the control element resets the selection element into the inoperative position. Thus, when the starting element is depressed again the pick-up arm cannot be actuated unless there is a record on the turntable. This is of advantage in particular if the player comprises a drawer carrying the turntable and the player can be started when the drawer is in the slid-in position or in other situations in which the turntable is not readily visible. The parts used for the construction in accordance with the invention have the advantage that they can easily be manufactured from a plastics, so that the disc-record player in accordance with the invention can be manufactured cheaply despite the use of the automatic control device.

It is to be noted that from Netherlands Patent Application No. 83404334 to which U.S. Pat. No. 4,701,903 corresponds a disc-record player is known which comprises a selection element which is set to an inoperative position after every pivotal movement of the pick-up arm to a position above the turntable, thereby precluding another pivotal movement of the pick-up arm once it has assumed the rest position.

However, this known disc-record player is of the semi-automatic type, in which an actuating button must be depressed to select the disc diameter. For this purpose the selection element can be coupled to the relevant actuating button via a system of rods. This known disc-record player does not employ the synchronisation of the player in accordance with the invention, in which the selection element is set to an inoperative position after one revolution of the turntable.

A preferred embodiment of the invention is characterized in that the positioning element comprises a positioning member which is pivotally connected to the selection element and whose pivotal axis is disposed in a plane which extends at least substantially perpendicularly to the pivotal axis of the pick-up arm. In this way a combination of a selection element and a positioning element is obtained such that the movement of the positioning element under the influence of the contact with the sensing pins is transmitted effectively to the selection element which accurately follows the movement of the positioning element. Further, the vertical movement of the positioning portions between the operative position and the rest position can be obtained very simply.

Another preferred embodiment of the invention is characterized in that the starting element comprises a starting member which is slidably guided on the deck plate and which comprises a run-on projection which pivots the positioning member to the operative position when the starting member is moved towards the first position. This results in a starting member which is capable of carrying a starting button outside the housing of the disc-record player, depression of this button causing the positioning member to be povited to the operative position via the run-on projection on the starting member.

With respect to the foregoing another preferred embodiment is characterized in that in the first position the starting member is latched behind a latching element arranged on the deck plate, whilst after the first revolution of the turntable the control means unlatch the starting member and the starting member returns to the second position under spring force. When the starting member is pressed inwards this member is effectively latched in the first position, whilst after one revolution of the turntable the starting member is returned automatically. In this way the starting member indirectly ensures that after one revolution of the turntable the positioning elements are automatically moved out of the path of the sensing pins. Thus upon starting the movement of the selection element is always completed after one revolution.

In the disc-record player known from the aforementioned German Patent Specification No. 2,446,130 the control means also comprise a command disc which can be driven by the turntable and which is coupled to a drive rod to which the drive element is connected near an end which is remote from the command disc, whilst after actuation of the starting member the drive rod and the drive element perform a forward and return movement. In this respect another preferred embodiment of the invention is characterized in that the drive rod carries a release element which after the first revolution of the turntable during the forward movement abuts against the starting member and disengages this starting member from the latching element. The release element on the drive rod and the coupling between the turntable and the drive element ensure a correctly synchronised movement, so that each time after completion of the first revolution of the turntable the starting member is returned to the second position and the positioning member is disengaged from the sensing pins.

Another preferred embodiment of the invention is characterized in that the control element is pivotally connected to the drive element and during at least a part of the return movement of the drive element is in an operative position in which the selection element is positioned in the inoperative position. The presence of the control element on the drive element ensures that during the return movement of the drive element the selection element is always reset in the inoperative position. Thus, each time after the pick-up arm has been set down the selection element is again in the inoperative position, so that in the case of re-starting the selection element first has to be reset to one of the two operative positions before the pick-up arm can be actuated again.

Yet another preferred embodiment of the invention is characterized in that during said part of the return movement of the drive element the control element moves between two convergent guide walls of the drive element, the control element setting the selection element to the inoperative position at the end of the movement between the guide walls.

In this respect another preferred embodiment is characterized in that at the beginning of the forward movement of the drive element the control element is disengaged from the selection element and is spaced from that side of the selection element in which the two convergent guide walls of the selection element terminate, the control element reaching said side until after completion of the first revolution of the turntable. This ensures that during the first revolution of the turntable, during which interval the selection element may be actuated, the control element is still disengaged from the selection element, so that the movement of the selection element to one of the operative positions can proceed without being obstructed by the control element.

A further preferred embodiment of the invention is characterized in that the drive element also carries an actuating element which is pivotable between an operative position and an inoperative position and which at the beginning of the return movement of the drive element is in the operative position, in which position the actuating element abuts against the pick-up arm support and is coupled thereto, whereupon after having passed one of the positioning projections on the selection member the actuating element is subsequently pivoted to the inoperative position. The actuating element on the drive element each time tends to actuate the pick-up arm support at the beginning of the return movement of the drive element, which is not possible if the third positioning projection is in the stop position because in this situation the actuating element abuts against the third positioning projection immediately the return movement of the drive element begins. This means that if the selection member has not been actuated the actuating element cannot pivot the pick-up arm towards the turntable. Only when the selection member is in one of the two operative positions it is possible for the actuating element to pivot the pick-up arm support up to the first or the second positioning projection. Regardless of the positioning projection against which the actuating element abuts the actuating element is always positioned into the inoperative position during the preceding return movement of the drive element, so that the return movement of the drive element can proceed without any obstruction.

A further preferred embodiment of the invention is characterized in that the drive element is pivotable about an axis which at least substantially coincides with the pivotal axis of the pick-up arm, whilst the positioning projections are situated on a selection portion of the selection member, which portion is curved substantially concentrically with the pivotal axis of the pick-up arm, and the first and the second positioning projection are situated at a smaller distance and a larger distance respectively from the pivotal axis of the pick-up arm than a third positioning projection, against which third positioning projection the actuating element abuts if after actuation of the starting member the selection member has not been moved via the positioning member. Thus, the control device can be of a compact construction, parts of the drive element and the selection member being disposed concentrically with the pivotal axis of the pick-up arm, which construction enables the disc-record player to be compact without thereby adversely affecting a correct automatic operation of the control device. As a result of the location of the third positioning projection at a distance from the pivotal axis of the pick-up arm, which distance is between the distance of the first and the second positioning projection from said pivotal axis, the inoperative position of the selection member can be an intermediate position between the two operative positions. As a result of this, the selection member need only be moved over a short distance from the inoperative position to the relevant position dictacted by the positioning element.

An embodiment of the invention will now be described in more detail, by way of example, with reference to the accompanying drawings. In the drawings:

FIG. 4 is a perspective view of the parts of the disc-record player shown in FIG. 2 in a situation in which the drive element has moved the pick-up arm to a position above the turntable;

FIG. 5 is a perspective view of a part of the control device of FIG. 2 drawn to an enlarged scale;

FIG. 6 is a perspective view of another part of the control device of FIG. 2 drawn to an enlarged scale;

FIG. 7 is an enlarged-scale sectional view of a part of the control device taken on the lines VII—VII in FIG.4;

FIG. 8 is a sectional view similar to FIG. 7, showing the relevant part of the control device in the position in which the actuating element becomes disengaged from the pick-up arm support.

Figure 1:
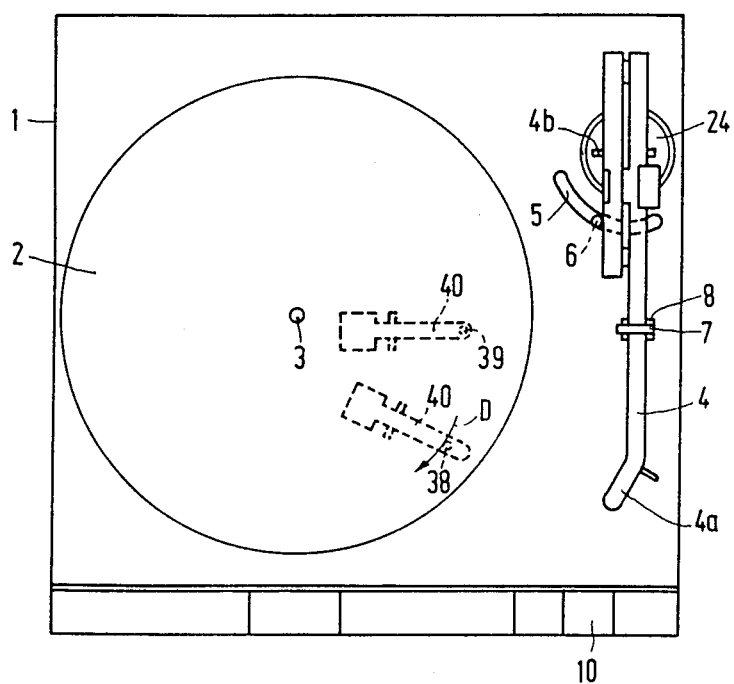
FIG. 1 is a plan view of a disc-record player in accordance with the invention.

The disc-record player shown in FIG. 1 comprises a deck plate 1 on which a turntable 2 is supported so as to be rotatable about a turntable shaft 3. The turntable 2 is driven by means of a belt, not shown, which is wrapped around the circumference of the turntable and around a pulley of a drive motor, not shown. On the upper side of the deck plate 1 there is arranged a pick-up arm 4 which carries a pick-up head 4a comprising a styluss by means of which a disc-record placed on the turntable 2 can be played. The pick-up arm 4 is pivotable up and down relative to the deck plate 1 about a horizontal pivotal axis 4b and is pivotable laterally about a pivotal axis 4c which extends substantially perpendicularly to the deck plate 1 (see FIG. 2). Below the arm 4 a curved lift support 5 is arranged on the upper end of a lift rod 6 which is movably guided in the deck plate 1. The arm 4 can be locked in a rest position by means of a clip 7 arranged on a pick-up arm rest 8. The deck plate 1 further carries a number of actuating buttons including a starting button 10. The other buttons, such as a turntable-speed selection button, a stop button and a lift button, do not require any description for an understanding of the present invention. It is to be noted that in a manner not shown the actuation of the starting button 10 also causes the drive motor of the turntable to be started, whilst after starting the speed of the turntable is selected automatically, in a manner not shown, depending on the diameter of the disc to be played via a control device to be described hereinafter, the speed being 33 ⅓ or 45 revolutions per minute depending on whether a 30 cm or 17 cm diameter disc is to be played. Underneath the deck plate 1 (see FIG. 2) a gear wheel 11 is connected to the turntable shaft 3. Further, a command disc 12 is rotatable about a spindle 12a which extends parallel to the shaft 3. The command disc 12 has teeth 13 which mesh with the gear wheel 11 during operation of the control device, to be described hereinafter, of the player in accordance with the invention. In the rest position, and when a disc record is being played, the gear wheel 11 engages in a recess 14 in the command disc where there are no teeth 13, so that in the rest positon the gear wheel 11 cannot drive the command disc 12. In its underside the command disc 12 is formed with a heart-shaped guide groove 13a which guides a pin 15 arranged near the free end of a drive rod 16. In a manner not shown the drive rod 16 is guided in the deck plate 1 in such a way that the rotation of the disc 12 can cause the rod 16 to perform a forward and return reciprocating movement. Before the forward movement starts the command disc must be rotated slightly in the direction indicated by the arrow A in FIG. 2. This is effected by means of a transmission mechanism, not shown, arranged between the command disc 12 and a starting member 17 connected to the starting button 10, so that after every depression of the starting button 10 in the direction indicated by the arrow B in FIG. 2, the command disc is rotated far enough to allow the gear wheel 11 to mesh with the teeth 13 of the disc 12.

Figure 2:
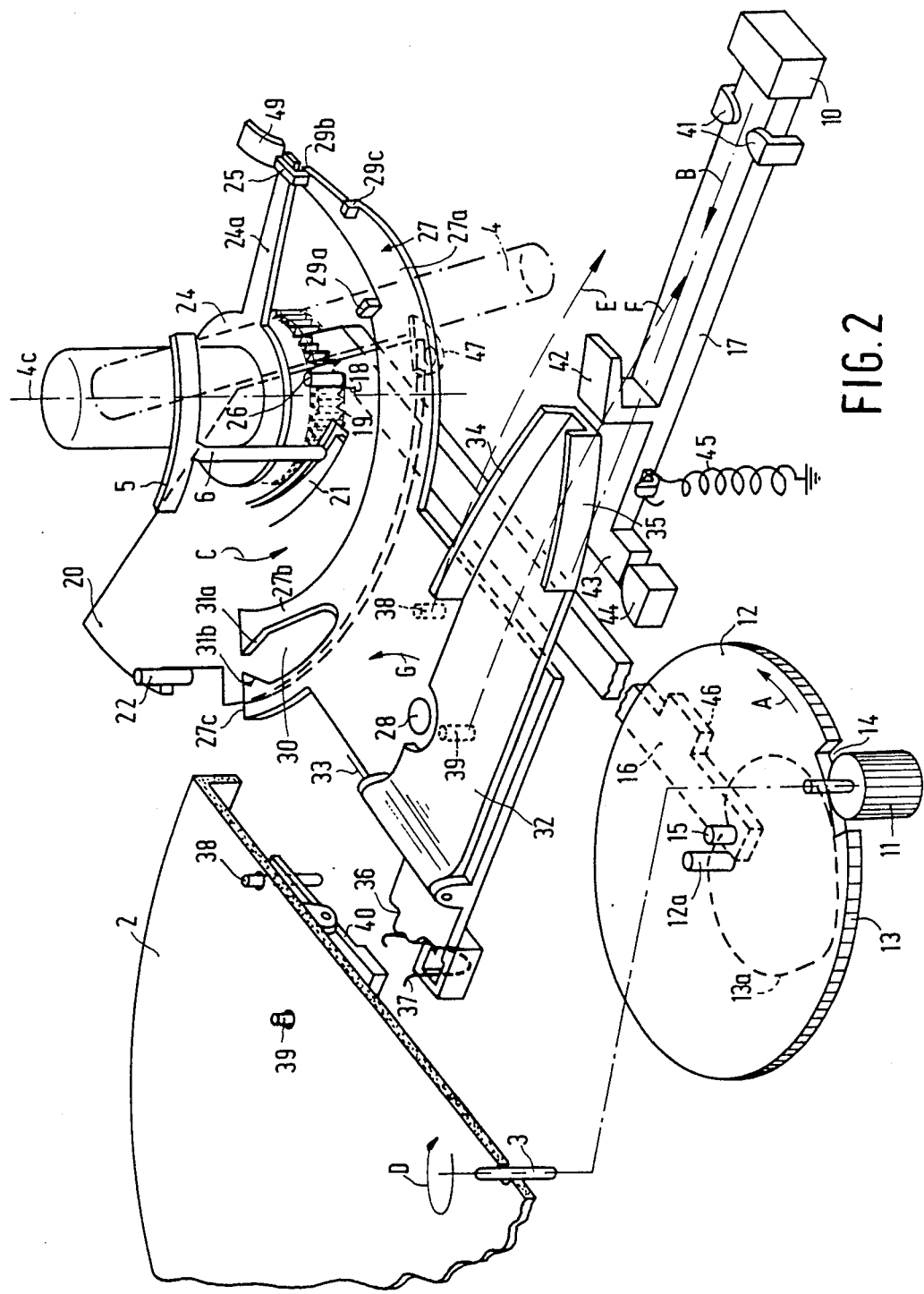
FIG. 2 is an enlarged-scale schematic perspective view of parts of the disc-record player shown in FIG. 1, the control device being shown in the rest position.
Figure 3:
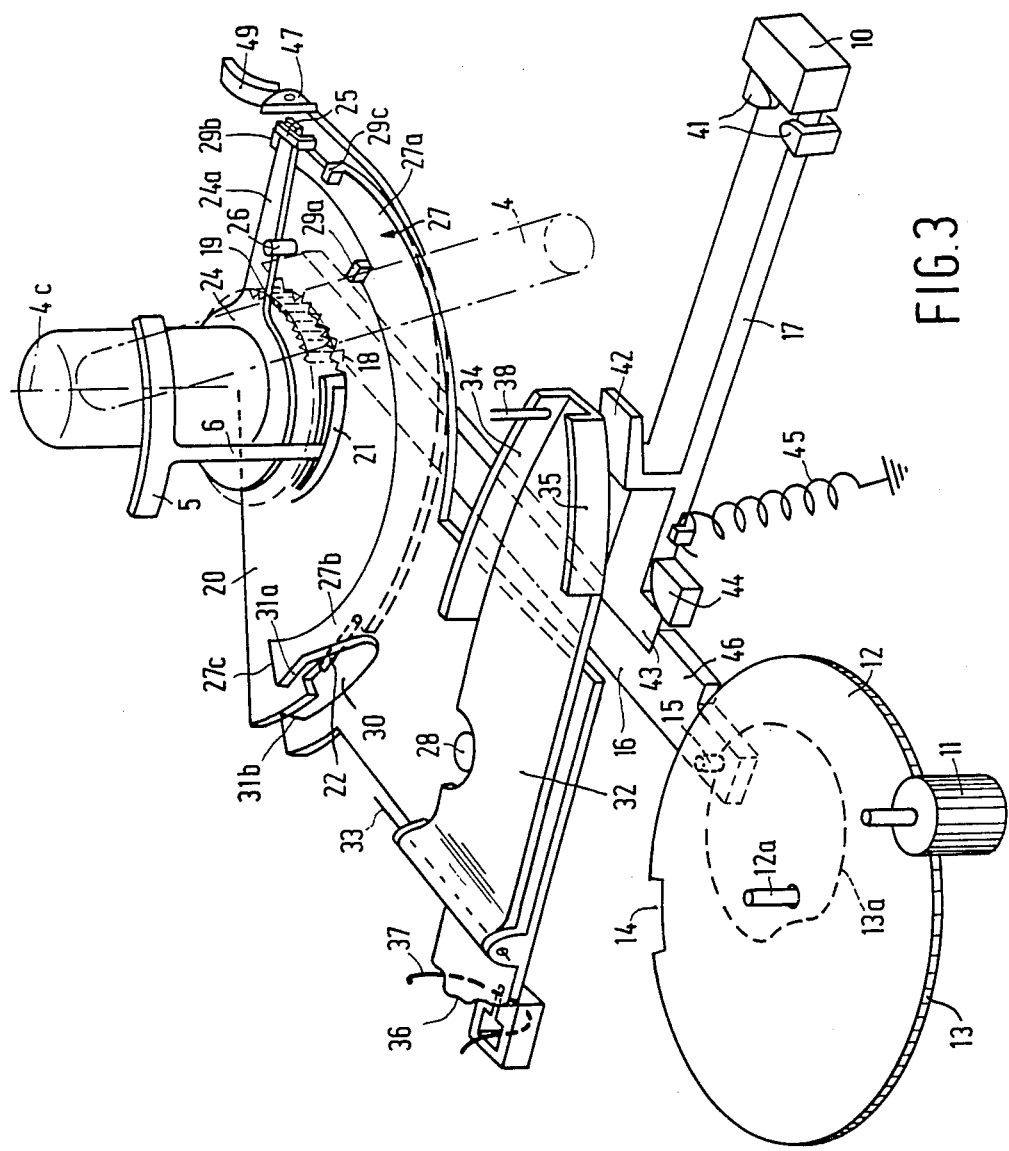
FIG. 3 is a schematic perspective view of the parts of the control device shown in FIG. 2 in a situation in which the positioning element has moved the selection member to an operative position.

In a manner not shown the command disc 12 is latched in the position shown in FIG. 2, but in the position shown in FIGS. 3 and 4 the command disc rotates in the direction indicated by the arrow A. Near the end which is remote from the command disc 12 the drive rod 16 carries a toothed rack 18, which during the forward and return movement of the drive rod drives a pinion 19 which is rotatable about an axis which coincides at least substantially with the pivotal axis 4c of the pick-up arm 4. The pinion 19 is integral with a drive element 20 constructed in the form of a plate which is shaped as a sector of a circle and which is arranged with its arsenate edge facing the command disc 12. The drive element 20 is formed with an inclined guideway 21 on which the end of the lift rod 6 bears in the situation shown in FIG. 2, the downward inclination of the guideway 21 relative to the upper surface of the drive element 20 causing the pick-up arm 4 to be lowered onto the pick-up arm rest 8 in the rest position. When the drive element 20 is rotated in the direction indicated by the arrow C during the forward movement of the drive rod 16, the guide way 21 causes the pick-up arm 4 to be lifted off the pick-up arm rest 8. The drive element 20 further carries a control element 22 which is pivotable about an axis 23 disposed in a plane substantially perpendicular to the pivotal axis 4c. The control element 22, which is constituted by a pin, is spring-loaded in such a way that it always tends to occupy the erect position shown in FIG. 5. Alternatively, the control element 22 may comprise a spring-steel wire mounted on the drive element 20.

Underneath the deck plate 1 the pick-up arm 4 is connected to a pick-up arm support 24 by means of the pivot defining the pivotal axis 4c. This pick-up arm support comprises an arm 24a which extends radially relative to the pivotal axis 4c and near its free end carries a stop projection 25 (see also FIGS. 6, 7 and 8). The stop projection 25 is pivotable relative to the arm 24a about a pivotal axis which extends substantially radially relative to the pivotal axis 4c. The drive element 20 also carries a pin 26 which serves to return the pick-up arm 4 to the rest position and for this purpose can abut against the pick-up arm support 24a.

A selection element is connected to the underside of the deck plate 1 and comprises a selection member 27 which is pivotable about a spindle 28. The selection member 27 comprises a portion 27a which is curved substantially concentrically with the pivotal axis of the pick-up arm and which carries three positioning projections 29a, 29b and 29c. In the position shown in FIG. 2 a first positioning projection 29a is situated at the smallest distance from the pivotal axis 4c in comparison with the other positioning projections, whilst a second positioning projection 29c is situated at the largest distance. A third positioning projection 29b is situated at a distance intermediate between the distance of the projections 29a and 29c from the pivotal axis 4c and comprises the free end of the portion 27a. The projections 29a and 29c comprise upwardly bent tabs of the portion 27a viewed relative to the spindle 28, the portion 27aand a further portion 27b of the selection member 27 are situated at the side of the selection member which faces the pivotal axis 4c. In the portion 27b a recess 30 is formed, which recess is bounded by walls 31a and 31b which converge towards a side 27c of the selection member and which at the side 27c define an opening which is large enough to allow the passage of the control element 22 in the erect position. This is important because during the return movement of the drive rod 16 this enables the control element 22 to reset the selection member 27 from an operative position in which the positioning projection 29a or 29c is positioned towards an inoperative position in which the third positioning projection 29b is positioned with respect to an actuating element 47, which will be described later. On the opposite side of the spindle 28 from the pivotal axis 4c then selection member 27 carries a positioning element 32 which is connected to the selection member 27 so as to be pivotable about an axis 33. This pivotal axis 33 is disposed in a plane which extends substantially perpendicularly to the pivotal axis 4c. The positioning element 32, which is constituted by a positioning member, extends from the pivotal axis 33 towards the front of the disc-record player where the starting button 10 is situated. As is shown in FIG. 2, the positioning element carries two positioning portions 34 and 35 on its upper side, which portions converge towards the front of the disc-record player, the positioning portion 34 having a greater length than the positioning portion 35 and the portion 35 being situated at a smaller distance from the turntable shaft 3 than the portion 34. In order to enable the selection member 27 to be set to one of the three positions, three recesses 36, in which a spring 37 engages, are formed near the connection of the position element 32 to the selection member 27.

Two sensing pins 38 and 39 are mounted in the turntable 2 at different distances from the turntable shaft 3. When a 17-cm record is present, only the sensing pin 39 is depressed and when a 30-cm disc record is present both sensing pins are depressed. The sensing pins extend through openings in the turntable and are each mounted on a tumbler 40 which is pivotable about an axis which extends tangentially with respect to the turntable shaft 3. At the end which is remote from the sensing pin each tumbler 40 has a heavier end portion, so that the disc need only exert a small force on the sensing pin to move the pin downwards. As is shown in FIG. 1, it is important that the sensing pins are spaced at a certain angle from each other relative to the turntable-shaft 3.

The starting element 17, comprising a starting member, is guided in the deck plate by means of guide portions 41. On its upper side the starting member 17 carries a run-on projection 42 which when the starting member is pressed inwards towards a first position slides against the underside of the positioning element 32. It is to be noted that alternatively the run-on projection 42 may be situated on the underside of the positioning element 32. As a result of this, the positioning portions 34 and 35 are raised from the rest position shown in FIG. 2 to the operative position in FIG. 3, in which position the positioning portions can cooperate with a depressed sensing pin 38 or 39. When the starting member 17 is moved inwards, as is shown in FIG. 3, a hook-shaped end portion 43 of the member is latched behind a latching element 44. A spring 45 keeping the starting member effectively latched behind the latching element. It is to be noted that the drive rod 16 is provided with a release element 46 which after one revolution of the turntable abuts against the hook-shaped end portion 43 (see FIG.3) and as the movement proceeds causes the starting member to become disengaged from the latching element 44, so that as a result of the force exerted by the spring 45 the starting member 17 is returned in a direction opposite to that indicated by the arrow B.

The drive element 20 comprises an actuating element 47 which is pivotable about a pivotal axis 37a which extends substantially radially relative to the pivotal axis 4c. The actuating element 47 comprises two edge portions which extend substantially perpendicularly relative to one another and against which a blade spring 48 can press. In this way the actuating element 47 can occupy two stable positions, namely an operative and an inoperative position. The operative position is shown in FIG. 7 in order to ensure that the arm 24a is firmly retained in the position shown in FIG. 7 during the movement of this arm, the actuating element 47 has a stepped stop edge 47b. Further, there is provided on the deck plate an abutment 49 against which the actuating element 47 can abut at the end of the forward movement of the drive rod 16, so that the actuating element can pivot from a position as shown in FIG. 2 into the upright operative position shown in FIG. 3.

The disc-record player in accordance with the invention operates as follows.

If, for example, a disc of 30-cm diameter is positioned on the turntable 2, the two sensing pins 38 and 39 are depressed. When the starting button 10 is depressed the selection member 27 always assumes a centre position as shown in FIG. 2. When the starting button 10 is pressed in the direction indicated by the arrow B from a second to a first position, the run-on projection 42 slides against the underside of the positioning element 32, so that the positioning element is moved from a lower rest position to an upper operative position. The positioning element remains in this position because the end portion 43 of the starting member 17 hooks behind the latching element 44. At the instant at which the start button 10 is pressed inwards the drive motor of the turntable 2 is also started. This causes the turntable to rotate in a direction as indicated by the arrow D and depression of the starting button 10 also causes the command disc 12 to mesh with the gear wheel 11, so that the drive rod 16 begins its forward movement as a result of the cam action of the groove 12b on the pin 15. As a result of the transmission ratio between the gear wheel 11 and the command disc 12 it takes a full revolution of the turntable 2 for the release element 46 to abut against the hook-shaped end portion 43 of the starting member 17 (FIG. 3). As is indicated in broken lines in FIG. 2, the sensing pins 38 and 39 move along paths indicated by the arrows E and F, FIG. 2 illustrating the situation in which the pin 38 has reached the positioning portion 34 of the positioning element 32 before the pin 39 reaches the corresponding positioning portion 35. This enables the pin 38 to move the positioning element 32 during contact with the inner side of the positioning portion 34, so that the selection member 27 is pivoted about the pivotal axis 28 in the direction indicated by the arrow G. As a result of this, the pin 39 then moves past the positioning portion 35 at the side thereof facing the turntable shaft 3 without coming into contact with the positioning portion 35. Consequently, as it travels along the path F, the pin 39 does not influence the position of the selection member. However, if at the instant that the starting button 10 is depressed the sensing pin 39 happens to be situated in the direct proximity of the positioning portion 35, the sensing pin 38 cannot directly contact the positioning portion 34. As can be seen in FIG. 2, the path E, in the center position of the selection member 27, extends along the side of the positioning portion 34 which is remote from the turntable shaft 3. However, since it always takes one full revolution of the turntable 2 for the positioning element 32 to return to the rest position as a result of the release of the starting element 17, the sensing pin 38, after the pin 39 has initially moved the selection member 27 in a direction opposite to that indicated by the arrow G, can again abut against the positioning portion 34. Thus, in the present situation, before a full revolution of the turntable is completed the sensing pin 38 has also moved the selection member 27 in the direction indicated by the arrow G via the positioning element 32. After this movement the selection member is in the position shown in FIG. 3. The second positioning projection 29c is then positioned to cooperate with the actuating element 47. As is also shown in FIG. 3, the arm 4 has been lifted by means of the lift support and is clear of the pick-up arm rest 8, whilst the control element 22 has been pivoted to the inoperative position and has moved beneath the selection member 27. Further, the actuating element 47 has abutted against the stop 49, so that the actuating element is in the operative position. FIG. 3 illustrates the situation in which the drive rod 16 and the drive element 20 have nearly reached the end of the forward movement. The spring 37 ensures that the selection member 27 is in the correct position. As the drive rod moves slightly further the starting member 17 is released as already described, so that the positioning element 32 returns to the rest position. During the subsequent return movement of the drive rod 16 the pick-up arm support is moved via the arm 24a in a manner as illustrated in FIGS. 4 and 7 until the actuating element 47 abuts against the positioning projection 29c. As the return movement of the drive element 20 proceeds the actuating element 47 is pivoted in a manner as shown in FIG. 8, the stop projection 25 preventing the arm 24a from being moved any further. At this instant the pick-up element 4a has reached the position above the turntable which corresponds to the set-down position above the record. As the return movement of the drive element 20 continues the lift rod 6, moving down the guideway 21, lowers the pick-up arm 4 so that the stylus is set down in the lead-in groove of the record on the turntable. During this movement the control element 2 is pivoted upwards again in a manner as described in the foregoing and subsequently the selection member is reset to the inoperative position by abutment of the control element 22 against the guide wall 31a. Thus, at the instant at which the stylus has reached the groove the stop projection 25 has become disengaged from the positioning projection 29c, so that during playing of the record the arm 4 can move freely towards the turntable shaft 3. After the control device has performed all its functions the recess 14, where the command disc 12 has no teeth 13, is again situated opposite the gear wheel 11, so that the command disc 12 stops rotating.

When the stylus has reached the lead-out groove near the center of the disc record the command disc 12 is started again in a manner not shown, the arm 4 being returned to the rest 8 via the pin 26 after the arm 4 has been lifted by the guideway 21. In this situation the selection member 27 remains in the inoperative position.

If a 17-cm disc record is placed on the turntable only the sensing pin 39 is depressed. Subsequently, by the cooperation of the pin 39 with the positioning portion 35 of the positioning element 32 the selection member 27 is moved in a direction opposite to that indicated by the arrow G, so that the first positioning projection 29a is moved into an operative position and, as the command disc 12 rotates further, the actuating element 47 can abut against this projection. As a result of this, the pick-up arm 4 is now moved further towards the turntable shaft 3 and the stylus is lowered into the lead-in groove of the 17-cm record.

An advantage of the construction in accordance with the invention is that if no disc record is present and the starting button 10 is depressed inadvertently, the pick-up arm 4 is not actuated by the control device. This is possible because the sensing pins are now not in contact with the positioning portions 34 and 35, whilst during the forward movement of the drive rod 16 the actuating element 47 abuts against the third positioning projection 29b which still occupies its original rest position. Thus, depression of the starting button 10 only results in the starting button being locked again after a short time, the selection member 27 not being actuated and the player being switched off again at the end of the return movement of the drive rod 16. This switching-off is effected because the pick-up arm 4 again returns to the rest 8, in which an electrical switch arranged in the connection to the drive motor is opened in a manner not shown. The result of the foregoing is that if no record is present and the starting button 10 is depressed, the arm 4 normally remains on the rest 8. This prevent the stylus from being lowered onto the turntable 2, thereby precluding damage to the stylus and/or the element 4a.

The disc-record player in accordance with the invention can be manufactured advantageously from a plastics and is therefore suitable for mass-production. In this way the construction in accordance with the invention enables a low-cost automatically operating disc-record player to be obtained. The compact construction of the control device enables a disc-record player within a width of 32 cm to be obtained, which is advantageous because this allows the player to be mounted in a rack system together with other equipment of corresponding width.

What is claimed is:

1. A disc-record player comprising a deck plate (1) carrying a rotatable turntable (2) and a pivotable pick-up arm (4) which is rigidly connected to a pick-up arm support (24) underneath said deck plate, in which turntable (2) two depressible sensing pins (38,39) are arranged at different distances from the turntable shaft (3) to sense the presence of a disc record on the turntable (2), a control device being provided which comprises:
   a drive element (20) which is movably connected to the deck plate (1) and which is provided for controlling the pivotal movement of the pick-up arm (4) from a rest position towards the turntable (2) and for this purpose can be coupled to the pick-up arm support (24),
   a selection element (27), which can be set selectively to two operative positions and carries first and second positioning projections (29a, 29c) which each constitute a stop for the pivotal movement of the pick-up arm support (24) as a result of the coupling to the drive element (20), to position the free end of the pick-up arm (4) above the turntable (2) in a first position and a second position respectively,
   a positioning element (32) which cooperates with the selection element (27) and which comprises first and second positioning portions (34,35) which during a revolution of the turntable (2) cooperate with a first or a second depressed sensing pin (38,39) respectively depending on the diameter of a disc record placed on the turntable (2) after which the positioning element (32) always sets the selection element (27) in one of the operative positions, and
   a starting element (17) which is movable between two positions and which by a movement to a first position causes the rotation of the turntable (2) to be started and the control device to be activated, characterized in that
   the positioning portions (34,35) are movable between an upper or operative and a lower or inoperative position, the positioning portions (34,35) being situated in the path of the respective depressed sensing pin (38,39) in the upper position only, p1 a movement of the starting element (17) to the first position causes the positioning portions (34,35) to be set to the upper position and a movement of the starting element (17) to a second position causes the positioning portions (34,35) to be set to the lower position,
   control means are provided which after the first revolution of the turntable (2) enable the starting element (17) to move out of the first position, so that the starting element (17) moves to the second position,
   the selection element (27) can also be set to an inoperative position in which a third positioning projection of the selection element (27) functions as a stop for the pick-up arm support (24) to prevent the pick-up arm (4) from being pivoted out of the rest position, and
   the drive element (20) carries a control element (22) which positions the selection element (27) into the inoperative position after every pivotal movement of the pick-up arm support (24) and of the free end of the pick-up arm (4) into one of the positions above the turntable(2).

2. A disc-record player as claimed in claim 1, characterized in that the positioning element (32) comprises a positioning member which is pivotally connected to the selection element (27) and whose pivotal axis (33) is disposed in a plane which extends at least substantially perpendicularly to the pivotal axis (4c) of the pick-up arm (4).

3. A disc-record player as claimed in claim 2, characterized in that the starting element (17) comprises a starting member which is slidably guided on the deck plate (1) and comprises a run-on projection (42) arranged between the starting member (17) and the positioning member (32) which run-on projection (42) pivots the positioning member (32) to the operative position during the movement of the starting member (17) to the first position.

4. A disc-record player as claimed in claim 3, characterized in that in the first position the starting member (17) is latched behind a latching element (44) arranged on the deck plate (1), whilst after the first revolution of the turntable (2) the control means unlatch the starting member (17) and the starting member returns to the second position under spring force.

5. A disc-record player as claimed in claim 4, in which the control means comprise a command disc (12) which can be driven by the turntable (2) and which is coupled to a drive rod (16) towhich the drive element (20) is connected near an end which is remote from the command disc, whilst after actuation of the staring member (17) the drive rod (16) and the drive element

(20) perform a forward and return movement, characterized in that the drive rod (17) carries a release element (46) which after the first revolution of the turntable (2) during the forward movement abuts against the starting member (17) and disengages this member from the latching element (44).

6. A disc-record player as claimed in claim 5, characterized in that the control element (22) is pivotably connected to the drive element (20) and during at least a part of the return movement of the drive element (20) is in an operative position in which the selection element (27) is positioned in the inoperative position.

7. A disc-record player as claimed in claim 6, characterized in that during said part of the return movement of the drive element (20) the control element (22) moves between two convergent guide walls (31a, 31b) of the drive element (20), the control element (22) setting the selection element (27) to the inoperative position at the end of the movement between the guide walls (31a,31b).

8. A disc-record player as claimed in claim 7, characterized in that the selection element (27) comprises a selection member which is pivotally connected to the deck plate and whose pivotal axis extend substantially parallel to the pivotal axis (4c) of the pick-up arm (4), and viewed relative to the pivotal axis of the selection member (27) the guide walls (31a,31b) and the positioning projections 29a, 29c) are situated at that side of the selection member (27) which faces the pivotal axis(4c)of the pick-up arm (4) and the positioning member (32) is situated at that side of the selection member (27) which is remote from the pivotal axis (4c) of the pick-up arm (4).

9. A disc-record player as claimed in claim 8, characterized in that at the beginning of the forward movement of the drive element (20) the control element (22) is disengaged from the selection element (27) and is spaced from that side (27c) of the selection element (27) in which the two convergent guide walls (31a,31b) of the selection element (27) terminate, the control element (22) not reaching said side (27c) until after completion of the first revolution of the turntable (2).

10. A disc-record player as claimed in claim 9, characterized in that after abutment against said side (27c) of the selection member (27) during the continued forward movement of the drive element (20) the control element (22) is pivoted into an inoperative position.

11. A disc-record player as claimed in claim 10, characterized in that the drive element (20) also carries an actuating element (47) which is pivotable between an operative and an inoperative position and which at the beginning of the return movement of the drive element (20) is in the operative position, in which position the actuating element (47) abuts against the pick-up arm support (24) and is coupled thereto, whereupon, after having passed one of the positioning projections (29a,29c) on the selection member (27), the actuating element (47) is subsequently pivoted to the inoperative position.

12. A disc-record player as claimed in claim 11, characterized in that the drive element (20) is pivotable about an axis which at least substantially coincides with the pivotal axis (4c) of the pick-up arm (4), whilst the positioning projections (29a,29c) are situated on a selection portion (27a) of the selection member (27), which portion (27a) is curved substantially concentrically with the pivotal axis of the pick-up arm (4) and the first and the second positioning projection (29a,29c) are situated at the smaller distance and a larger distance respectively from the pivotal axis (4c) of the pick-up arm than a third positioning projection (29b), against which third positioning projection (29b) the actuating element (47) abuts if after actuation of the starting member (17) the selection member (27) has not been moved via the positioning member (32).

13. A disc-record player as claimed in claim 12, characterized in that the convergent guide walls (31a,31b) of the selection member (27) bound a recess (30) in a further part (27b) of the selection member (27), which part (27b) is also curved substantially concentrically with the pivotal axis (4c) of the pick-up arm (4).

14. A disc-record player as claimed in claim 7, characterized in that at the beginning of the forward movement of the drive element (20) the control element (22) is disengaged from the selection element (27) and is spaced from that side (27c) of the selection element (27) in which the two convergent guide walls (31a,31b) of the selection element (27) terminate, the control element (22) not reaching said side (27c) until after completion of the first revolution of the turntable (2).

15. A disc-record player as claimed in claim 14, characterized in that after abutment against said side (27c) of the selection member (27) during the continued forward movement of the drive element (20) the control element (22) is pivoted into an inoperative position.

16. A disc-record player as claimed in claim 7, characterized in that the drive element (20) also carries an actuating element (47) which is pivotable between an operative and an inoperative position and which at the beginning of the return movement of the drive element (20) is in the operative position, in which position the actuating element (47) abuts against the pick-up arm support (24) and is coupled thereto, whereupon, after having passed one of the positioning projections (29a,29c) on the selection member (27), the actuating element (47) is subsequently pivoted to the inoperative position.

17. A disc-record player as claimed claim 16, characterized in that the drive element (20) is pivotable about an axis which at least substantially coincides with the pivotal axis (4c) of the pick-up arm (4), whilst the positioning projections (29a,29c) are situated on a selection portion (27a) of the selection member (27), which portion (27a) is curved substantially concentrically with the pivotal axis of the pick-up arm (4) and the first and the second positioning projection (29a,29c) are situated at the smaller distance and a larger distance respectively from the pivotal axis (4c) of the pick-up arm than a third positioning projection (29b), against which third positioning projection (29b) the actuating element (47) abuts if after actuation of the starting member (17) the selection member (27) has not been moved via the positioning member (32).

18. A disc-record player as claimed in claim 17, characterized in that the convergent guide walls (31a,31b) of the selection member (27) bound a recess (30) in a further part (27b) of the selection member (27), which part (27b) is also curved substantially concentrically with the pivotal axis (4c) of the pick-up arm (4).

19. A disc-record player as claimed in claim 5, characterized in that the drive element (20) also carries an actuating element (47) which is pivotable between an operative and an inoperative position and which at the beginning of the return movement of the drive element (20) is in the operative position, in which position the actuating element (47) abuts against the pick-up arm support (24) and is coupled thereto, whereupon, after having passed one of the positioning projections (29a,29c) on the selection member (27), the actuating element (47) is subsequently pivoted to the inoperative position.

20. A disc-record player as claimed in claim 19, characterized in that the drive element (20) is pivotable about an axis which at least substantially coincides with the pivotal axis (4c) of the pick-up arm (4), whilst the positioning projections (29a,29c) are situated on a selection portion (27a) of the selection member (27), which portion (27a) is curved substantially concentrically with the pivotal axis of the pick-up arm (4) and the first and the second positioning projection (29a,29c) are situated at the smaller distance and a larger distance respectively from the pivotal axis (4c) of the pick-up arm than a third positioning projection (29b), against which third positioning projection (29b) the actuating element (47) abuts if after actuation of the starting member (17) the selection member (27) has not been moved via the positioning member (32).

* * * * *

UNITED STATES PATENT AND TRADEMARK OFFICE
CERTIFICATE OF CORRECTION

PATENT NO. : 4,766,586

DATED : August 23, 1988

INVENTOR(S) : HERMANUS F. EINHAUS

It is certified that error appears in the above-identified patent and that said Letters Patent is hereby corrected as shown below:

Claim 1, line 42 (Col 12, line 15): Delete "pl" and start a new paragraph with "a"

Signed and Sealed this

Twenty-eighth Day of February, 1989

Attest:

DONALD J. QUIGG

Attesting Officer

Commissioner of Patents and Trademarks